(12) United States Patent
Alshin et al.

(10) Patent No.: US 8,396,314 B2
(45) Date of Patent: Mar. 12, 2013

(54) METHOD AND APPARATUS FOR INVERSE QUANTIZING IMAGE, AND METHOD AND APPARATUS FOR DECODING IMAGE

(75) Inventors: Alexander Alshin, Suwon-si (KR); Elena Alshina, Suwon-si (KR); Ekaterina Nesterova, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 795 days.

(21) Appl. No.: 12/551,750

(22) Filed: Sep. 1, 2009

(65) Prior Publication Data

US 2010/0054619 A1   Mar. 4, 2010

(30) Foreign Application Priority Data

Sep. 1, 2008   (KR) .................... 10-2008-0085915

(51) Int. Cl.
*G06K 9/36* (2006.01)
(52) U.S. Cl. ..................................... 382/252
(58) Field of Classification Search .............. 382/232, 382/233, 248–253
See application file for complete search history.

(56) References Cited

U.S. PATENT DOCUMENTS

| 6,185,254 | B1 | 2/2001 | Ogata |
| 2003/0002581 | A1 | 1/2003 | Moni et al. |
| 2004/0114685 | A1 | 6/2004 | Kouloheris et al. |
| 2006/0215916 | A1 | 9/2006 | Kimura |
| 2006/2155916 | | 9/2006 | Kimura |
| 2006/0269156 | A1 * | 11/2006 | Takahashi et al. ............ 382/251 |
| 2007/0116371 | A1 * | 5/2007 | Kimura ........................ 382/251 |
| 2008/0101465 | A1 | 5/2008 | Chono et al. |

FOREIGN PATENT DOCUMENTS

| CN | 1662069 A | 8/2005 |
| CN | 1838723 A | 9/2006 |
| EP | 0 917 373 A2 | 5/1999 |
| EP | 0 987 902 A2 | 3/2000 |
| JP | 10-191391 A | 7/1998 |

OTHER PUBLICATIONS

International Search Report and Written Opinion dated Apr. 8, 2010, issued in counterpart Application No. PCT/KR2009/004834.
Communication dated Oct. 4, 2011, issued by the European Patent Office in counterpart European Application No. 09810227.0.
Communication dated Oct. 24, 2012, issued by the State Intellectual Property Office of the People's Republic of China in counterpart Chinese Patent Application No. 200980134255.4.
Office Action, dated Jan. 29, 2013, issued by the Japanese Patent Office in counterpart Japanese Patent Application No. 2011-524907.

* cited by examiner

*Primary Examiner* — Duy M Dang
(74) *Attorney, Agent, or Firm* — Sughrue Mion, PLLC (57) ABSTRACT

Provided are method and apparatus for inverse quantizing an image, the method including: determining a quantization step correction value for reducing a quantization error, which is a difference between an inverse quantization coefficient, obtained by inverse quantizing a quantization coefficient, and an original value of the transformation coefficient; and inverse quantizing the quantization coefficient using a second quantization step value, the second quantization step value being obtained by correcting a first quantization step value used for inverse quantizing the quantization coefficient using the determined quantization step correction value.

14 Claims, 5 Drawing Sheets

METHOD AND APPARATUS FOR INVERSE QUANTIZING IMAGE, AND METHOD AND APPARATUS FOR DECODING IMAGE

CROSS-REFERENCE TO RELATED PATENT APPLICATION

This application claims the benefit of Korean Patent Application No. 10-2008-0085915, filed on Sep. 1, 2008, in the Korean Intellectual Property Office, the disclosure of which is incorporated herein in its entirety by reference.

BACKGROUND OF THE INVENTION

1. Field of the Invention

Exemplary embodiments of the present invention relate to inverse quantization of an image, and more particularly, to method and apparatus for inverse quantizing an image capable of reducing quantization error during decoding of an image and a method and apparatus for decoding an image using the method and apparatus for inverse quantizing an image.

2. Description of the Related Art

Generally, in the video compression standards such as Moving Picture Expert Group (MPEG) and H.26X, image data is compressed through operations including predicting image data, transforming the image data, quantizing the image data, and encoding the image data, thereby generating a bitstream.

In the predicting operation, a prediction image of the image data to be encoded is generated through intra-prediction using spatial correlation of the image or inter-prediction using temporal correlation of the image.

In the transforming operation, error data, which is the difference between the prediction image generated in the predicting operation and an original image, is transformed into a transform domain using various transforming methods. Examples of the transforming methods include Discrete Cosine Transform (DCT) and wavelet transform, etc.

In the quantizing operation, transformation coefficients generated by the transforming operation are appropriately lossy-compressed according to a size of the target bitstream. Most standard images and video codecs based on lossy compression perform quantizing and inverse quantizing operations by employing a quantization step. In the quantizing, an input value is divided by the quantization step and is rounded to integer so as to obtain a quantized value. Since the quantized value becomes an integer within a range of 1/(quantization step) from an original range of the input value, information is lossy-compressed through the quantizing operation. All lossy compression technologies include the quantizing operation such that original data cannot be restored completely but compression ratio may be increased.

When quantization is applied and thereafter, the encoded image is decoded, the quantization step is multiplied by the quantized value so as to perform inverse quantization. The quantized value becomes an integer within a range of 1/(quantization step) from a range of an original value so that an error known as a quantization error may be generated between an inverse quantized value and the original value.

SUMMARY OF THE INVENTION

Exemplary embodiments of the present invention provide methods and apparatuses for inverse quantizing an image which reduces a difference between a value restored through inverse quantization and an original value, that is, a quantization error, by improving an inverse quantization operation, and a method and apparatus for decoding an image using the method and apparatus for inverse quantizing an image.

According to an aspect of the present invention, there is provided a method of inverse quantizing an image, the method including: extracting a quantization coefficient, obtained by quantizing a transformation coefficient, from an encoded bitstream; determining a quantization step correction value for reducing a quantization error, which is the difference between an inverse quantization coefficient, obtained by inverse quantizing the quantization coefficient, and an original value of the transformation coefficient; and inverse quantizing of the quantization coefficient using a second quantization step value, the second quantization step value being obtained by correcting a first quantization step value used for inverse quantizing the quantization coefficient, using the determined quantization step correction value.

According to another aspect of the present invention, there is provided an apparatus for inverse quantizing an image, the apparatus including: a quantization step correction value determination unit determining a quantization step correction value for reducing a quantization error, which is the difference between an inverse quantization coefficient, obtained by inverse quantizing a quantization coefficient extracted from an encoded bitstream, and an original value of the transformation coefficient; and an inverse quantization performing unit inverse quantizing of the quantization coefficient using a second quantization step value, the second quantization step value being obtained by correcting a first quantization step value used for inverse quantizing the quantization coefficient using the determined quantization step correction value.

According to another aspect of the present invention, there is provided a method of decoding an image, the method including: performing entropy decoding on an encoded bitstream and extracting a prediction mode information of texture data and a quantization coefficient; determining a quantization step correction value for reducing a quantization error, which is the difference between an inverse quantization coefficient, obtained by inverse quantizing the quantization coefficient, and an original value of the transformation coefficient; inverse quantizing of the quantization coefficient using a second quantization step value, the second quantization step value being obtained by correcting a first quantization step value used for inverse quantizing the quantization coefficient using the determined quantization step correction value, and thereby generating a transformation coefficient; inverse transforming the transformation coefficient and generating a residual; performing prediction according to the prediction mode information and generating prediction data; and adding the prediction data and the residual and restoring the image.

According to another aspect of the present invention, there is provided an apparatus for decoding an image, the apparatus including: an entropy decoder performing entropy decoding for an encoded bitstream and extracting prediction mode information of texture data and a quantization coefficient; a quantization step correction value determination unit determining a quantization step correction value for reducing a quantization error, which is a difference between an inverse quantization coefficient, obtained by inverse quantizing the quantization coefficient, and an original value of the transformation coefficient; an inverse quantization performing unit inverse quantizing of the quantization coefficient using a second quantization step value, the second quantization step value being obtained by correcting a first quantization step value used for inverse quantizing the quantization coefficient using the determined quantization step correction value, and thereby generating a transformation coefficient; an inverse converting unit inverse transforming the transformation coefficient and generating a residual data; a prediction unit performing prediction according to the prediction mode information and generating prediction data; and an adding unit adding the prediction data and the residual data and restoring the image.

BRIEF DESCRIPTION OF THE DRAWINGS

The above and other features and aspects of the present invention will become more apparent by describing in detail exemplary embodiments thereof with reference to the attached drawings in which.

Figure 1:
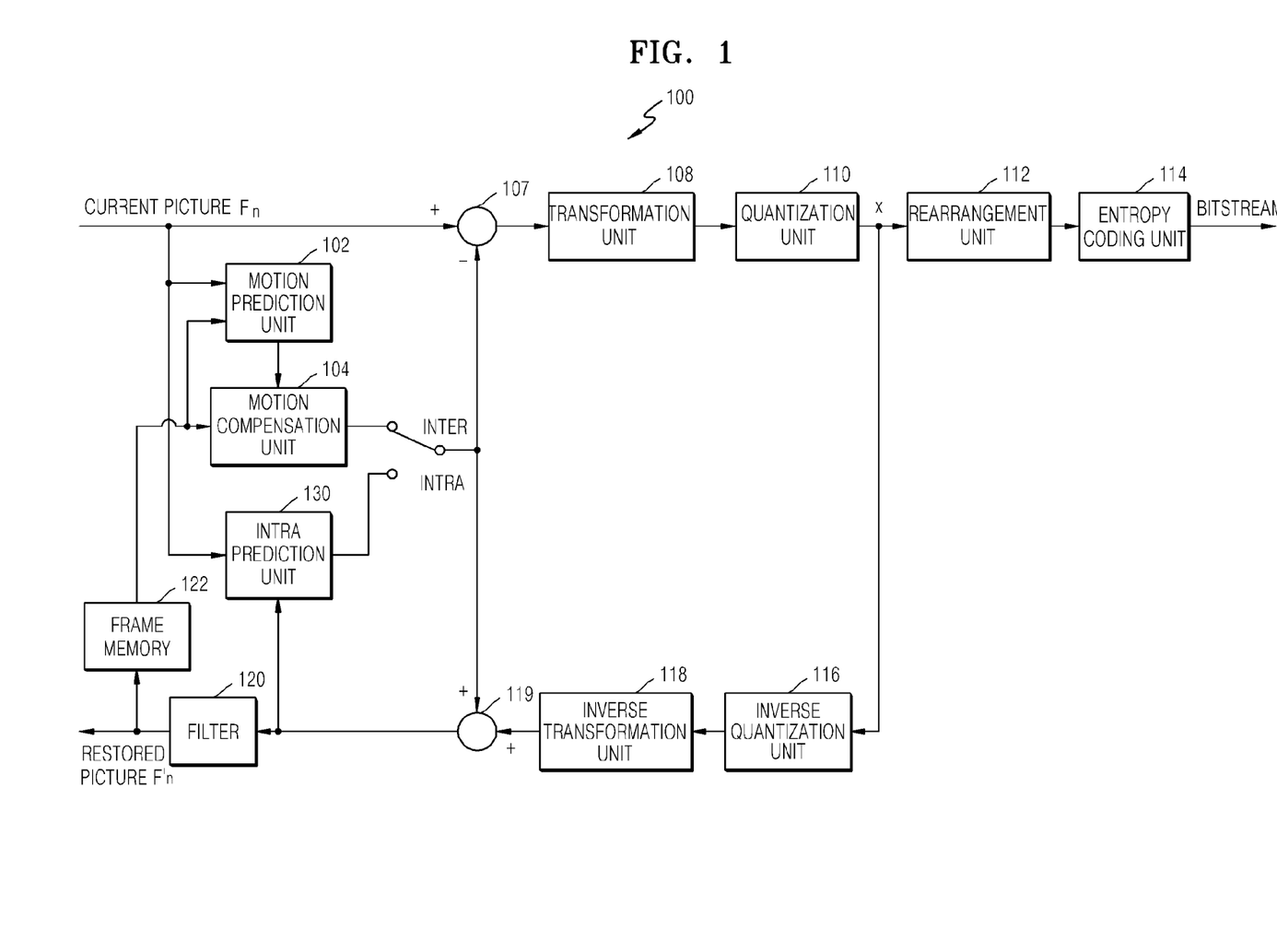
FIG. 1 is a block diagram of an apparatus for encoding an image according to an embodiment of the present invention.

tization unit 110 performs quantization for the transformation coefficient so as to perform compression (hereinafter, a quantization transformation coefficient is referred to as a "quantization coefficient"). For example, quantization according to H.264/Advanced Video Coding (AVC) is defined as in Equation 1 below.

$$Q\_Coeff = sgn(Coeff) * round[(Coeff)/Q\_Step + Offset] \quad \text{[Equation 1]}$$

Here, Coeff, Offset, Q_Step, and Q_Coeff are respectively denoted as an original transformation coefficient, an offset, a quantization step, and a quantized transformation coefficient. Also, "round" denotes an operation matching a real number value included in a bracket [ ] with an integer that is not larger than the real number value and is closest to the real number value. In addition, when a Coeff value in a bracket is larger than 0, a sgn(Coeff) function has a value of 1 and when a Coeff value in a bracket is less than 0, a sgn(Coeff) function has a value of −1. Offset may be set to have the same real number value from 0 to 1 in an encoder and a decoder.

Referring to Equation 1, the quantization unit 110 divides the transformation coefficient by a predetermined quantization step Q_Step so as to perform quantization, thereby outputting the quantization coefficient. The quantization step Q_Step may have a value predetermined by a quantization parameter QP according to the image compression standard. For example, in H.264/AVC, the quantization steps Q_Step have values predetermined by the quantization parameter QP as in Table 1 below.

TABLE 1

| QP | 0 | 1 | 2 | 3 | 4 | 5 | 6 | 7 | 8 | 9 | 10 | ... |
|---|---|---|---|---|---|---|---|---|---|---|---|---|
| Q_Step | 0.625 | 0.6875 | 0.8125 | 0.875 | 1 | 125 | 1.25 | 1.375 | 1.625 | 1.75 | 2 | ... |
| QP | ... | 18 | ... | 24 | ... | 30 | ... | 36 | ... | 42 | ... | 48 |
| Q_Step | | 5 | | 10 | | 20 | | 40 | | 80 | | 160 |

DETAILED DESCRIPTION OF THE INVENTION

Hereinafter, the present invention will be described more fully with reference to the accompanying drawings, in which exemplary embodiments of the invention are shown.

FIG. 1 is a block diagram of an apparatus 100 for encoding an image according to an embodiment of the present invention.

Referring to FIG. 1, the apparatus 100 for encoding an image includes a motion prediction unit 102, a motion compensation unit 104, an intra prediction unit 130, a subtraction unit 107, a transformation unit 108, a quantization unit 110, a rearrangement unit 112, an entropy coding unit 114, an inverse quantization unit 116, an inverse transformation unit 118, an adding unit 119, a filter 120, and a frame memory 122.

The motion prediction unit 102 and the motion compensation unit 104 use previous frames stored in the frame memory 122 and perform motion prediction and compensation, thereby generating an inter predicted block. The intra prediction unit 130 performs intra prediction for finding out a prediction block of a current input block in a current frame.

After inter prediction or intra prediction is performed and the prediction block to be referred to by the current block is generated, the subtraction unit 107 subtracts the prediction block from the current block and generates a residual block.

In order to remove the spatial relationship, the transformation unit 108 transforms the residual block into a frequency domain and outputs a transformation coefficient. The quan- FIG. 2 is a graph showing the relationship between the quantization parameter QP and the quantization step Q_Step.

Figure 2:
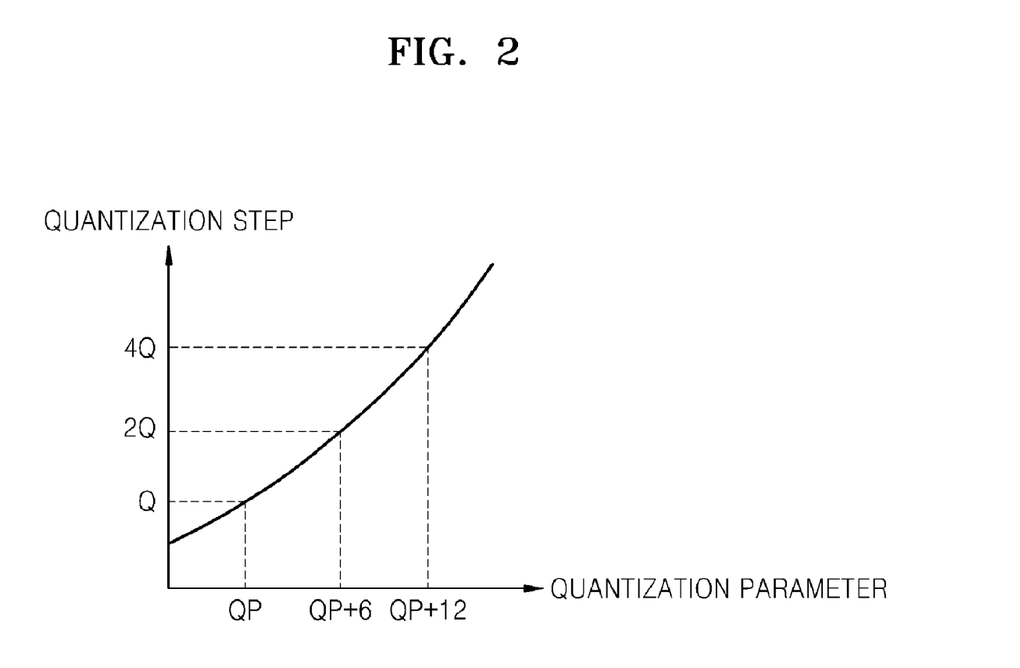
FIG. 2 is a graph showing the relationship between a quantization parameter QP and a quantization step.

Referring to FIG. 2, the quantization parameter QP is generally proportional to the quantization step Q_Step. For example, as shown in Table 1, as the quantization parameter QP increases by a value of 6, the quantization step Q_Step is doubled in H.264/AVC. Accordingly, the quantization unit 110 performs quantization using the quantization step Q_Step determined by the quantization parameter QP.

The quantization coefficients are re-arranged in a predetermined order and then are entropy encoded by the entropy coding unit 114, thereby generating a bitstream.

In order to obtain a reference picture used in the predicting of a B picture or a P picture, a quantized picture is restored through the inverse quantization unit 116 and the inverse transformation unit 118. Here, the inverse quantization unit 116 may be an apparatus for inverse quantizing, which will be described later, or a general apparatus for inverse quantizing. The restored picture passes through the filter 120 for deblocking filtering and then is stored in the frame memory 122. Then, the stored picture is used as the reference picture of a next picture.

Figure 3:
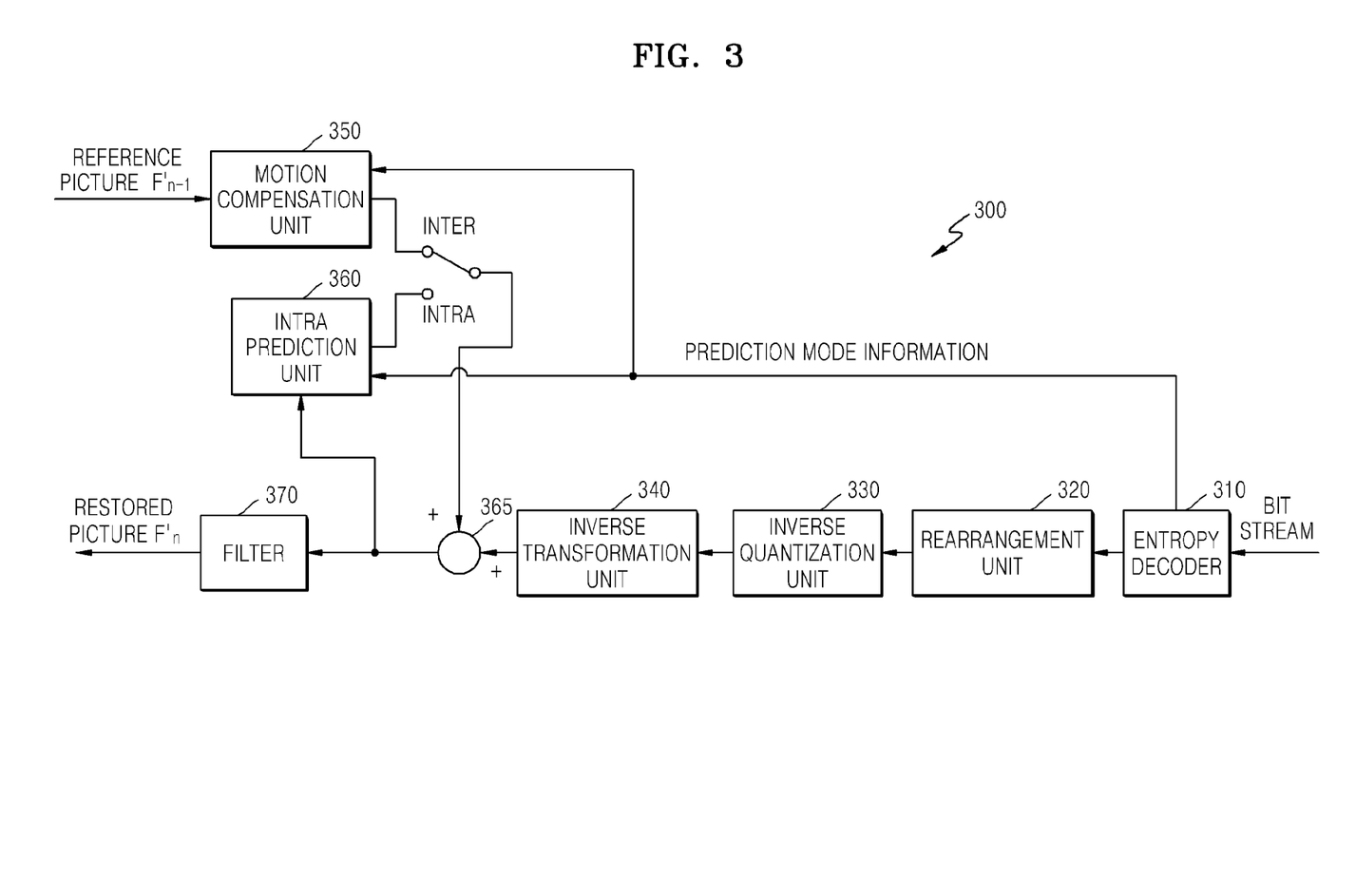
FIG. 3 is a block diagram of an apparatus for decoding an image according to an embodiment of the present invention.

FIG. 3 is a block diagram of an apparatus 300 for decoding an image according to an embodiment of the present invention.

The apparatus 300 for decoding an image includes an entropy decoder 310, a rearrangement unit 320, an inverse quantization unit 330, an inverse transformation unit 340, a motion compensation unit 350, an intra prediction unit 360, and a filter 370.

The entropy decoder 310 and the rearrangement unit 320 receive a compressed bitstream and perform entropy decoding, thereby extracting prediction mode information of texture data and quantization coefficients.

The inverse quantization unit 330 performs inverse quantization for the quantization coefficients and outputs transformation coefficients. In particular, in order to reduce a quantization error, that is the difference between a coefficient inverse quantized from the quantization coefficient (hereinafter, referred to as an "inverse quantization coefficient") extracted from a bitstream and the original value of the transformation coefficient, the inverse quantization unit 330 according to the current embodiment corrects the quantization step value and performs inverse quantization using the corrected quantization step. More specifically, Coeff, Q_Step, Q_Coeff, InverseQ_Coeff, Offset, and round respectively denote an original transformation coefficient, a quantization step, a quantization coefficient, an inverse quantization coefficient, an offset, and an operation matching a real number value included in a bracket [ ] with an integer that is not larger than the real number value and is the closest to the real number value. In the related art, the quantization coefficient Q_Coeff is multiplied by the quantization step Q_Step and then, a predetermined offset is added thereto, thereby performing inverse quantization, as in Equation 2.

$$\text{Inverse}Q\_Coeff = \text{sgn}(Q\_coeff) * \text{round}[Q\_Coeff * Q\_Step + Offset] \quad \text{[Equation 2]}$$

The inverse quantization coefficient InverseQ_Coeff is different from the original coefficient Coeff due to a round operation during quantization. As described above, the difference between the inverse quantization coefficient InverseQ_Coeff and the original transformation coefficient Coeff is defined as the quantization error. For example, assuming that the original transformation coefficient Coeff, the quantization step Q_Step, and the offset Offset are respectively 26, 4, and ⅓, then the original transformation coefficient Coeff, 26, is quantized to round[26/4+⅓]≈round[6.83]=6 through Equation 1. In this case, the quantization coefficient is 6. When inverse quantization is performed for the quantization coefficient, 6, using Equation 2 according to the related art, round [6*4+⅓]≈round[24.33]=24 and the inverse quantization coefficient InverseQ_Coeff is 24. As such, in the related art, the quantized and restored value of 26 is 24, thereby having a quantization error of 2.

In order to reduce the difference between the original value and the value restored through quantization and inverse quantization, the inverse quantization unit 330 according to the current embodiment corrects the quantization step value and performs inverse quantization using the corrected quantization step.

Figure 4:
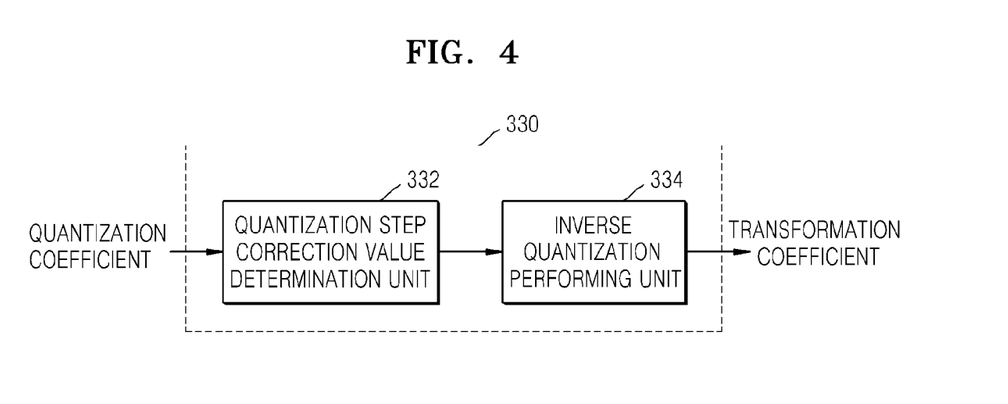
FIG. 4 is a block diagram of an inverse quantization unit of FIG. 3.

FIG. 4 is a block diagram of the inverse quantization unit 330 of FIG. 3.

Referring to FIG. 4, the inverse quantization unit 330 includes a quantization step correction value determination unit 332 and an inverse quantization performing unit 334.

The quantization step correction value determination unit 332 determines a quantization step correction value for reducing the quantization error, that is, the difference between the inverse quantization coefficient and the original transformation coefficient. More specifically, the quantization step correction value determination unit 332 presumes linearity between the restored transformation coefficient, that is, the inverse quantization coefficient, and the quantization error and determines the quantization step correction value, which is weight multiplied to a first quantization step value determined according to the quantization parameter QP.

Figure 5:
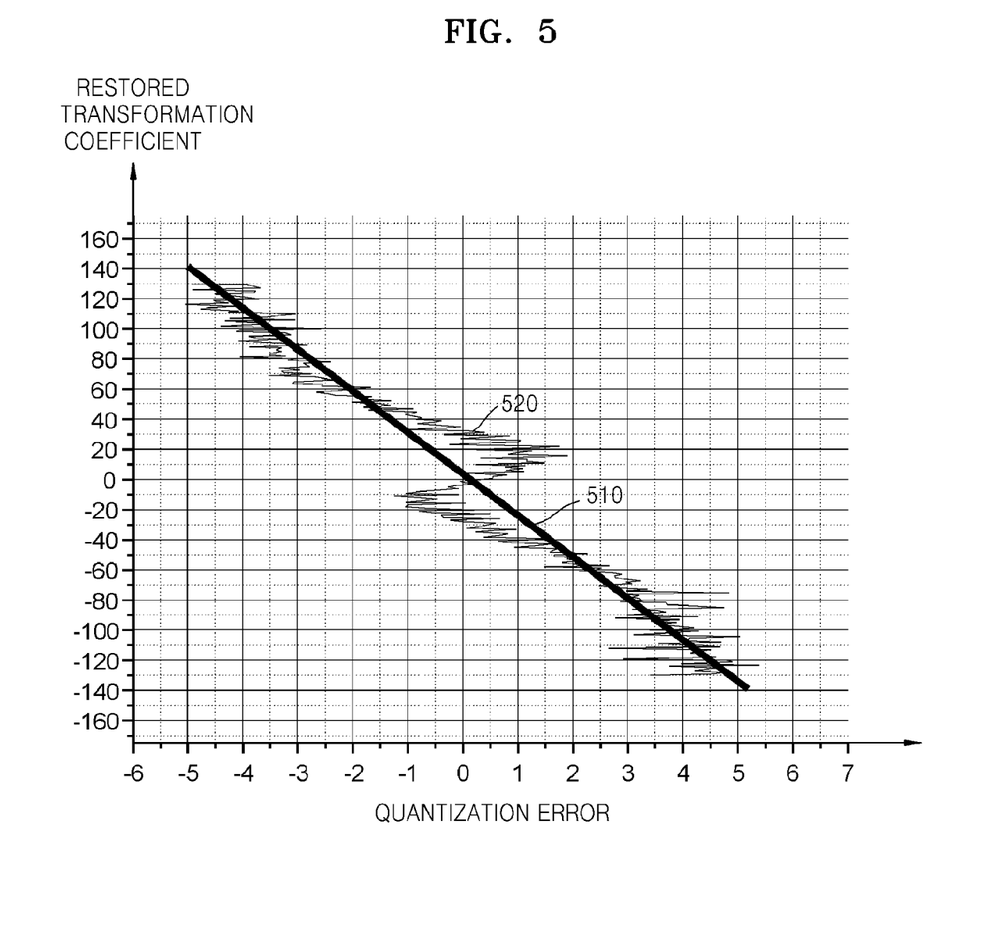
FIG. 5 is a graph showing the relationship between a restored transformation coefficient and a quantization error.

FIG. 5 is a graph showing the relationship between the restored transformation coefficient and the quantization error. In FIG. 5, an x-axis indicates the quantization error, that is, the difference between the restored transformation coefficient and the original transformation coefficient and a y-axis indicates the restored transformation coefficient. The reference numeral 520 is denoted as an actual difference between the restored transformation coefficient and the original transformation coefficient, that is, an actual quantization error, during encoding of the image. Referring to FIG. 5, the restored transformation coefficient is generally in proportion to the quantization error. In other words, as the value of the restored transformation coefficient increases, the quantization error also increases. In the current embodiment, the relationship between the restored transformation coefficient and the quantization error is presumed to be linear as is shown by the presence of the straight line denoted by reference numeral 510 and a predetermined weight indicating the linearity, that is, the quantization step correction value, is applied to the quantization step, thereby reducing the quantization error.

More specifically, when it is assumed that the original transformation coefficient, the quantization step used in quantizing the original transformation coefficient, and the restored transformation coefficient are respectively denoted as Coeff, Q_Step, and Coeff', the quantization error $E_Q$, that is, the difference between the restored transformation coefficient Coeff' and the original transformation coefficient Coeff has a value obtained by Coeff'−Coeff. As illustrated in FIG. 5, as a value of the restored transformation coefficient Coeff' increases, the quantization error $E_Q$ increases. Thus, the quantization error $E_Q$ indicates linearity, which indicates that as the restored transformation coefficient Coeff' increases, the difference between the restored transformation coefficient Coeff' and the original transformation coefficient Coeff increases. The original transformation coefficient Coeff has a fixed value. Thus, in order to reduce the quantization error $E_Q$, a value of the restored transformation coefficient Coeff' may be restored to be similar to the original transformation coefficient Coeff. According to Equation 2, when the restored transformation coefficient Coeff' is calculated, a value obtained by multiplying the quantization coefficient Q_Coeff by the quantization step Q_Step is used as a factor. Accordingly, the quantization step Q_Step is corrected and the corrected quantization step Q_Step is used to change a value of the restored transformation coefficient Coeff', thereby reducing the quantization step Q_Step. According to the current embodiment, the quantization step Q_Step is multiplied by a quantization step correction value Wt, which is a predetermined weight, based on the linearity between the restored transformation coefficient Coeff' and the quantization error $E_Q$, instead of the original quantization step Q_Step, and then the corrected quantization step is used to restore the quantization coefficient, thereby reducing the quantization error $E_Q$.

Referring back to FIG. 4, when the first quantization step and the quantization step correction value, which are predetermined in order to inverse quantize the quantization coefficient according to the quantization parameter QP, are respectively denoted as Q_Step and Wt, the quantization step correction value determination unit 332 determines a second quantization step Q_Step' calculated using Equation 3 below as the final quantization step for inverse quantizing the quantization coefficient.

$$Q\_Step' = Q\_Step * Wt \quad \text{[Equation 3]}$$

Here, the quantization step correction value Wt may have one of real number values from 1.03 to 1.04.

The inverse quantization performing unit 334 performs inverse quantization for the quantization coefficient Q_Coeff as in Equation 4 using the determined second quantization step Q_Step' and outputs the inverse quantization coefficient, InverseQ_Coeff.

$$\text{Inverse}Q\_\text{Coeff} = \text{sgn}(Q\_\text{coeff}) * \text{round}[Q\_\text{Coeff} * Q\_\text{Step}' + \text{Offset}] \quad [\text{Equation 4}]$$

As described above, when the original transformation coefficient Coeff, the quantization step Q_Step, and the offset Offset are respectively 26, 6, and ⅓, the quantization coefficient Q_Coeff is 6 and when inverse quantization is performed for the quantization coefficient, 6, using the Equation 2 according to the related art, the inverse quantization coefficient InverseQ_Coeff is 24. In the current embodiment, when the quantization step correction value Wt to be applied is 1.04, the original first quantization step Q_Step, 4, is corrected to the second quantization step Q_Step' having the value of 4*1.04=4.16 through Equation 3. The inverse quantization performing unit 334 applies the corrected value of the second quantization step Q_Step', 4.16 to Equation 4 and performs inverse quantization so as to output the inverse quantization coefficient InverseQ_Coeff, round[6*4.16+⅓] =25. Comparing the related art and the current embodiment, the quantization error is 2 in inverse quantization according to the related art, whereas the quantization error is reduced to 1 in inverse quantization according to the current embodiment. As such, since the quantization error is reduced in the current embodiment of the present invention, overall compression efficiency of the image may be improved.

Referring back to FIG. 3, the inverse converting unit 340 performs inverse quantization for inverse quantized transformation coefficients and generates residual data. The motion compensation unit 350 and the intra prediction unit 360 generate a prediction block according to prediction mode information extracted from a bitstream. An adding unit 365 adds the residual data and the prediction block and decodes the current block. The restored block passes through the filter 370 and is stored in a storage unit (not illustrated). The stored block is used as a reference data during decoding a next picture.

Figure 6:
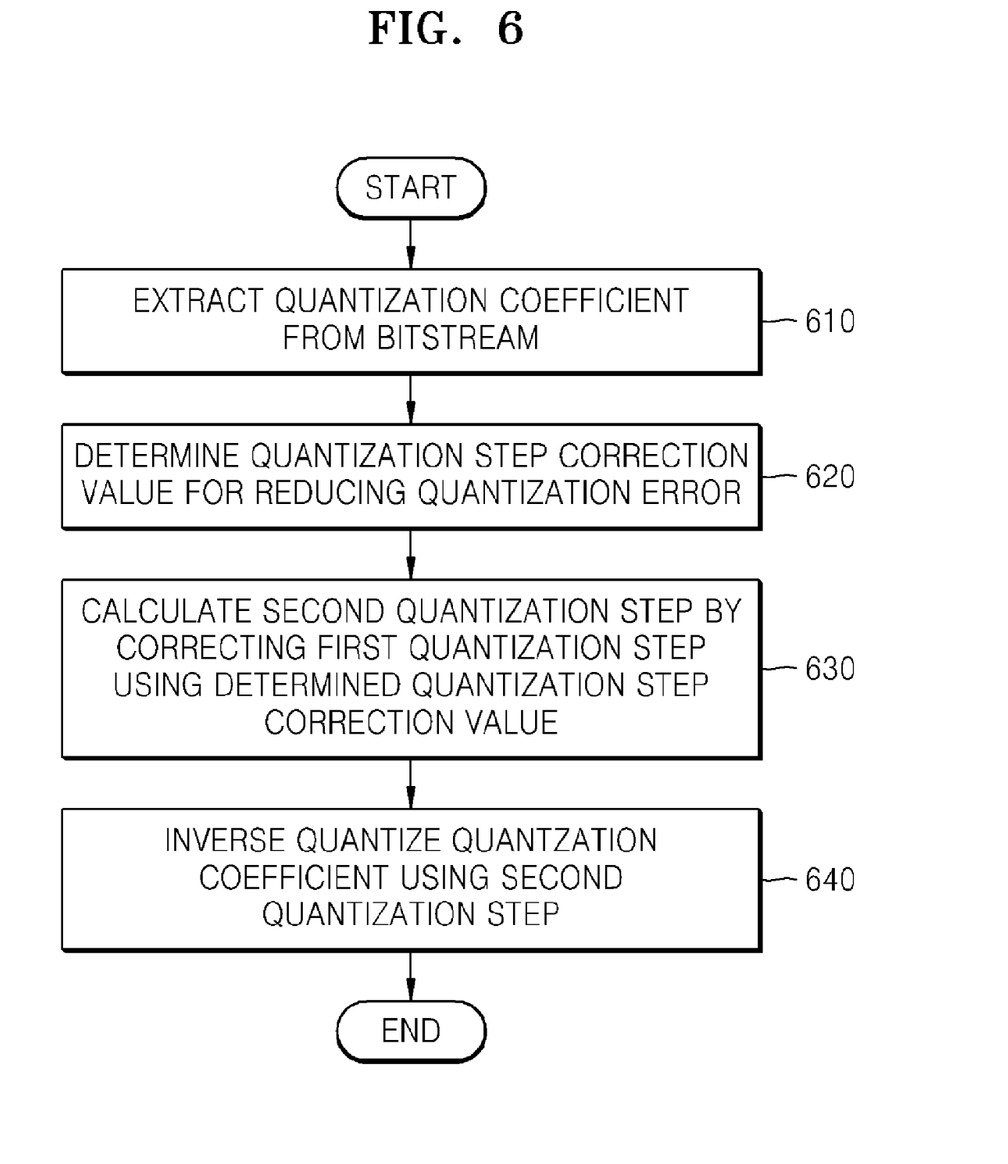
FIG. 6 is a flowchart illustrating a method of inverse quantizing an image according to an embodiment of the present invention.

FIG. 6 is a flowchart illustrating a method of inverse quantizing an image according to an embodiment of the present invention.

Referring to FIG. 6, the quantization coefficient, obtained by quantizing the transformation coefficient, is extracted from an encoded bitstream, in operation 610.

In operation 620, the quantization step correction value for reducing the quantization error, that is the difference between the inverse quantization coefficient, obtained by inverse quantizing the quantization coefficient, and the original transformation coefficient, is determined. As described above, the quantization step correction value Wt is weight multiplied to the first quantization step Q_Step predetermined according to the quantization parameter QP and may be appropriately determined by making the relationship between the restored transformation coefficient and the quantization error linear. The quantization step correction value may be a real number from 1.03 to 1.04 so that the quantization error occurring due to various image properties may be reduced.

In operation 630, the first quantization step Q_Step is corrected using the determined quantization step correction value Wt and the second quantization step value Q_step' is generated. As described above, the second quantization step value Q_step' may be obtained by multiplying the first quantization step Q_Step by the determined quantization step correction value Wt.

In operation 640, as in Equation 4, an integer, which is not larger than the value obtained by multiplying the quantization coefficient Q_Coeff by the second quantization step Q_Step' and then adding an offset thereto, is determined, thereby performing inverse quantization.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. In other exemplary embodiments, the computer readable recording medium may include carrier waves (such as data transmission through the Internet). In yet other exemplary embodiments, computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of inverse quantizing an image, the method comprising:

extracting a quantization coefficient from the encoded bitstream;

determining a quantization step correction value for reducing a quantization error, the quantization error comprising a difference between an inverse quantization coefficient, obtained by first inverse quantizing the quantization coefficient, and an original value of the transformation coefficient; and second inverse quantizing the quantization coefficient using a second quantization step value, the second quantization step value being obtained by correcting a first quantization step value used for the first inverse quantizing the quantization coefficient, the first quantization step value being corrected based on the determined quantization step correction value.

2. The method of claim 1, wherein the determining of the quantization step correction value is based on a linear relationship model between the inverse quantization coefficient and the quantization error.

3. The method of claim 1, wherein the quantization step correction value is a weight multiplied to the first quantization step value.

4. The method of claim 3, wherein the quantization step correction value is one of real numbers from 1.03 to 1.04.

5. The method of claim 1, wherein in the second inverse quantizing of the quantization coefficient, an integer, which is not larger than a value obtained by multiplying the quantization coefficient by the second quantization step value and adding a predetermined offset thereto, is calculated.

6. An apparatus for inverse quantizing an image, the apparatus comprising:

a quantization step correction value determination unit which determines a quantization step correction value for reducing a quantization error, the quantization error comprising a difference between an inverse quantization coefficient obtained by first inverse quantizing a quantization coefficient extracted from an encoded bitstream, and an original value of a transformation coefficient; and an inverse quantization performing unit which second inverse quantizes the quantization coefficient using a second quantization step value, the second quantization step value being obtained by correcting a first quantization step value used for the first inverse quantizing the quantization coefficient, the first quantization being corrected based on the determined quantization step correction value.

7. The apparatus of claim 6, wherein the quantization step correction value determination unit determines the quantization step correction value based on a linear relationship model between the inverse quantization coefficient and the quantization error.

8. The apparatus of claim 6, wherein the quantization step correction value is a weight multiplied to the first quantization step value.

9. The apparatus of claim 8, wherein the quantization step correction value is one of real numbers from 1.03 to 1.04.

10. The apparatus of claim 6, wherein the inverse quantization performing unit calculates an integer, which is not larger than a value obtained by multiplying the quantization coefficient by the second quantization step value and adding a predetermined offset thereto.

11. A method of decoding an image, the method comprising:

entropy decoding an encoded bitstream and extracting a prediction mode information of texture data and a quantization coefficient;

determining a quantization step correction value for reducing a quantization error, which is a difference between an inverse quantization coefficient obtained by inverse quantizing the quantization coefficient, and an original value of a transformation coefficient;

inverse quantizing the quantization coefficient using a second quantization step value, the second quantization step value being obtained by correcting a first quantization step value used for inverse quantizing the quantization coefficient, the correcting of the first quantization step value being based on the determined quantization step correction value, and generating a transformation coefficient;

inverse transforming the transformation coefficient and generating a residual;

performing prediction according to the prediction mode information and generating prediction data; and adding the prediction data and the residual to restore the image.

12. An apparatus for decoding an encoded image, the apparatus comprising:

an entropy decoder which entropy decodes an encoded bitstream and extracts prediction mode information of texture data and a quantization coefficient;

a quantization step correction value determination unit which determines a quantization step correction value for reducing a quantization error, which is a difference between an inverse quantization coefficient obtained by first inverse quantizing the quantization coefficient, and an original value of a transformation coefficient;

an inverse quantization performing unit which second inverse quantizes the quantization coefficient using a second quantization step value, the second quantization step value being obtained by correcting a first quantization step value used for first inverse quantizing the quantization coefficient, the correcting the first quantization step value based on the determined quantization step correction value, and generates a transformation coefficient;

an inverse transformation unit which inverse transforms the transformation coefficient and generates a residual data;

a prediction unit which performs prediction according to the prediction mode information and generates prediction data; and an adding unit which adds the prediction data and the residual data to restore the image.

13. A non-transitory computer-readable recording medium having recorded thereon a computer executable program code for executing the method of claim 1.

14. A non-transitory computer-readable recording medium having recorded thereon a computer executable program code for executing the method of claim 11.

* * * * *